United States Patent [19]

Maeno et al.

[11] Patent Number: 4,882,519
[45] Date of Patent: Nov. 21, 1989

[54] DISCHARGE ELECTRODE MATERIAL COMPOSED OF YTTRIUM AND RHENIUM OR RUTHENIUM

[75] Inventors: Yoshinori Maeno; Hiroshi Mikita; Sadao Umezu, all of Neyagawa; Fukuhisa Matsuda, Kawanishi; Masao Ushio, Toyonaka, all of Japan

[73] Assignee: Toho Kinzoku Co., Ltd., Osaka, Japan

[21] Appl. No.: 175,431

[22] Filed: Mar. 30, 1988

[51] Int. Cl.⁴ .............................................. H01J 1/14
[52] U.S. Cl. .................................... 313/633; 252/514; 252/518
[58] Field of Search ................ 313/633; 252/509, 514, 252/512, 518, 521

[56] References Cited

U.S. PATENT DOCUMENTS 3,784,928  1/1974  Crane ........................... 313/633 X
4,303,848  12/1981  Shimizu et al. ................ 313/633 X

FOREIGN PATENT DOCUMENTS 1240778  7/1971  United Kingdom ................ 313/633

Primary Examiner—Kenneth Wieder
Attorney, Agent, or Firm—Armstrong, Nikaido, Marmelstein, Kubovcik & Murray

[57] ABSTRACT

Disclosed is a discharge electrode material essentially made of yttrium oxide and blended with rhenium or ruthenium. This electrode material is used as the electrode for air plasma cutting, electrode for plasma spraying, and others, and it is excellent in heat resistance and oxidation resistance, and its wear resistance is more than twice as high as that of conventional electrode materials such as zirconium and hafnium.

3 Claims, 4 Drawing Sheets

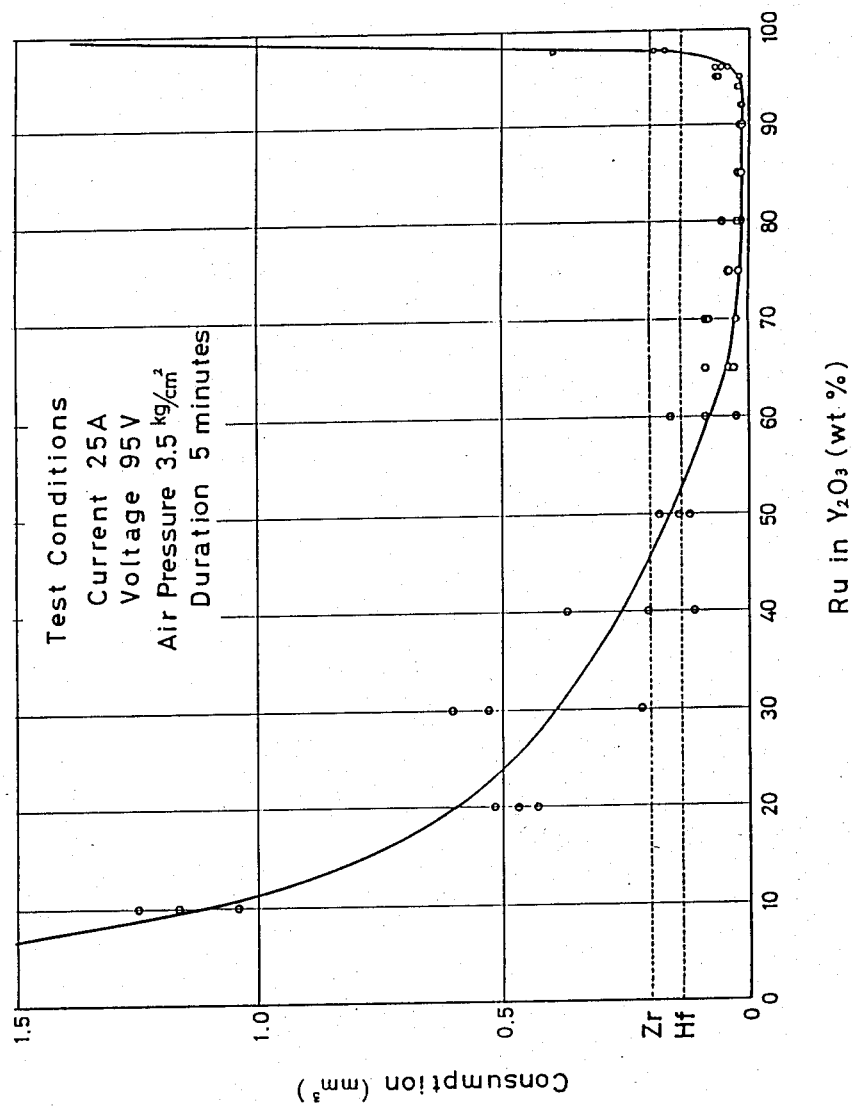

DISCHARGE ELECTRODE MATERIAL COMPOSED OF YTTRIUM AND RHENIUM OR RUTHENIUM

BACKGROUND OF THE INVENTION

Electrode materials usable in cutting of metal materials in an oxidizing atmosphere such as fresh air and oxygen atmosphere are limited to only very small part of metal materials such as hafnium and zirconium. Aside from them, there are various electrode materials excellent in conductivity and heat resistance, but they are readily consumed in an oxidizing atmosphere and are not practically usable.

Hafnium and zirconium are extremely expensive and are hard to obtain, and the cutting cost is very high. Recently, in addition to the improvement and diversification of the cutting equipment, automation and robotics are rapidly promoted for the purposes of saving labor cost and mass production, but the development of the cutting equipment is limited by the delay in improvement of the electrode material.

BRIEF SUMMARY OF THE INVENTION

It is hence a primary object of this invention to present a discharge electrode material capable of obtaining a high performance at a lower cost than the conventional electrode made of hafnium or zirconium, and this electrode material is essentially made of yttrium oxide, to which rhenium or ruthenium is added.

Of these components of the electrode, rhenium and ruthenium are high in melting point, and are excellent in oxidation resistance, in particular, high temperature oxidation resistance. Besides, yttrium oxide is particularly excellent in discharge characteristic, and by combining ruthenium and yttrium oxide at a proper ratio, it is possible to keep a stable discharge performance while minimizing the oxidation consumption and heat consumption. In the electrode material made of rhenium and yttrium oxide, the preferable content of rhenium is 59 to 95% by weight, and the content of yttrium oxide in this case is preferably 50 to 5%. Or in the case of electrode material made of ruthenium and yttrium oxide, the preferable content of ruthenium is 49 to 98% by weight, and the content of yttrium oxide in this case is preferably 60 to 2%. This electrode material is an alloy of yttrium oxide with rhenium or ruthenium, but traces of other elements may be added as far as its characteristic is not sacrificed.

This electrode material may be fabricated, for example, in the following method. First, to the starting material of rhenium powder (for example, having a mean particle size of 3 to 4 um) or ruthenium powder (for example, having a mean particle size of 15 to 20 um), yttrium oxide powder (for example, having a mean particle size of 5 to 6 um) is added and blended, and the obtained mixture powder is pressurized and formed into a desired shape.

Thus obtained compressed powder is sintered according to a known method to obtained a desired electrode material.

This electrode material is excellent in availability in comparison with the conventional zirconium or hafnium, and possesses a wear resistance of about two or three times as high when compared with them, and it can obtain a stable arc characteristic. This electrode material can sufficiently exhibit its characteristics for use in air plasma cutting, plasma spraying, heat resistant and oxidation resistant services, and others.

BRIEF DESCRIPTION OF THE DRAWINGS

FIG. 3 and FIG. 4 are graphs to express the relation between composition and wear resistance.

DETAILED DESCRIPTION OF THE INVENTION

This invention is described in further details below by referring to some of its embodiments.

[Embodiment 1]

Rhenium powder with mean particle size of 3.55 $\mu$m and purity of 99.99%, and yttrium oxide powder with mean particle size of 5.7 $\mu$m and purity of 99.9% were mixed in dry state for 30 minutes by means of a shaker-mixer. A binder was added to this mixture powder to granulate. Obtained grains of mixture powder of rhenium (Re) and yttrium oxide ($Y_2O_3$) were pressurized in a mold to become compressed powder of 2 mm in diameter and 4 mm in length (compressed powder density 65 to 75%), and it was presintered in hydrogen stream (500° C.×15 minutes) and sintered (2,200° C.×30 minutes) by conventional method, and an electrode material made of a sinter of 1.7 mm in diameter and 3.5 mm in length was obtained.

Figure 1:
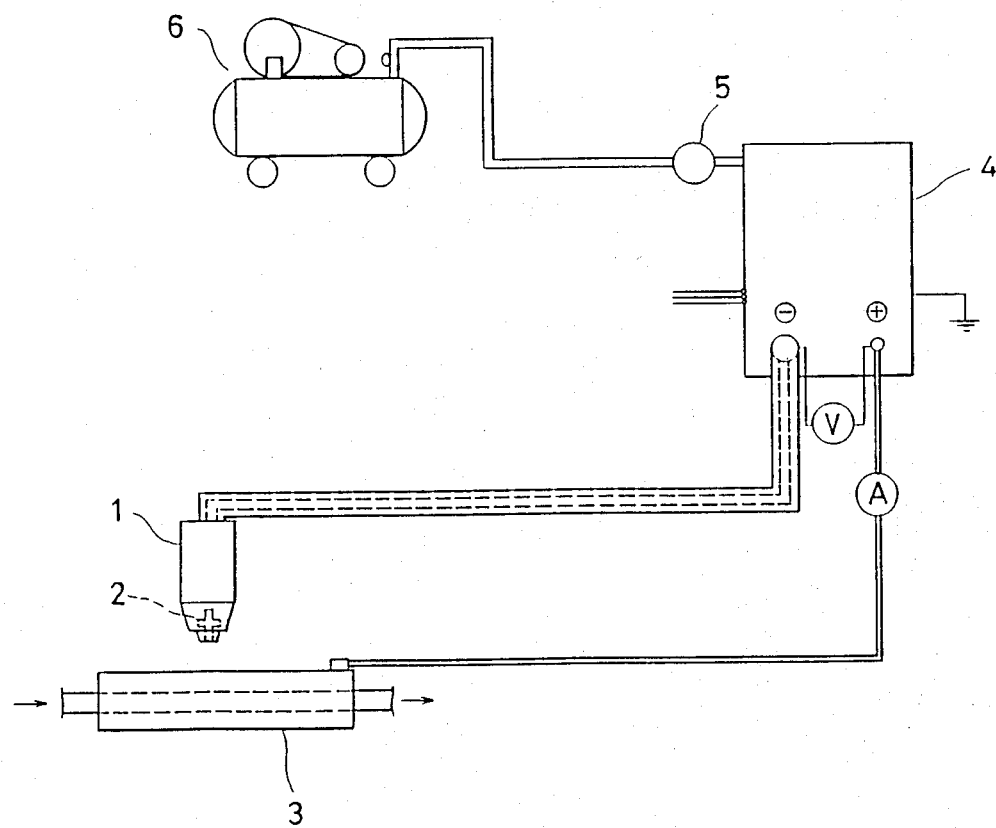
FIG. 1 and FIG. 2 are explanatory drawings of a testing equipment.
Figure 2:
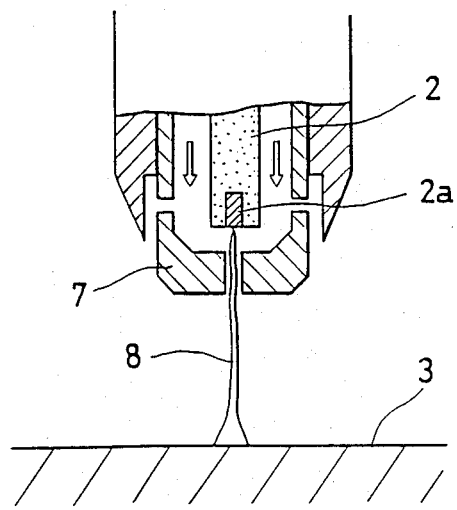
Figure 3:
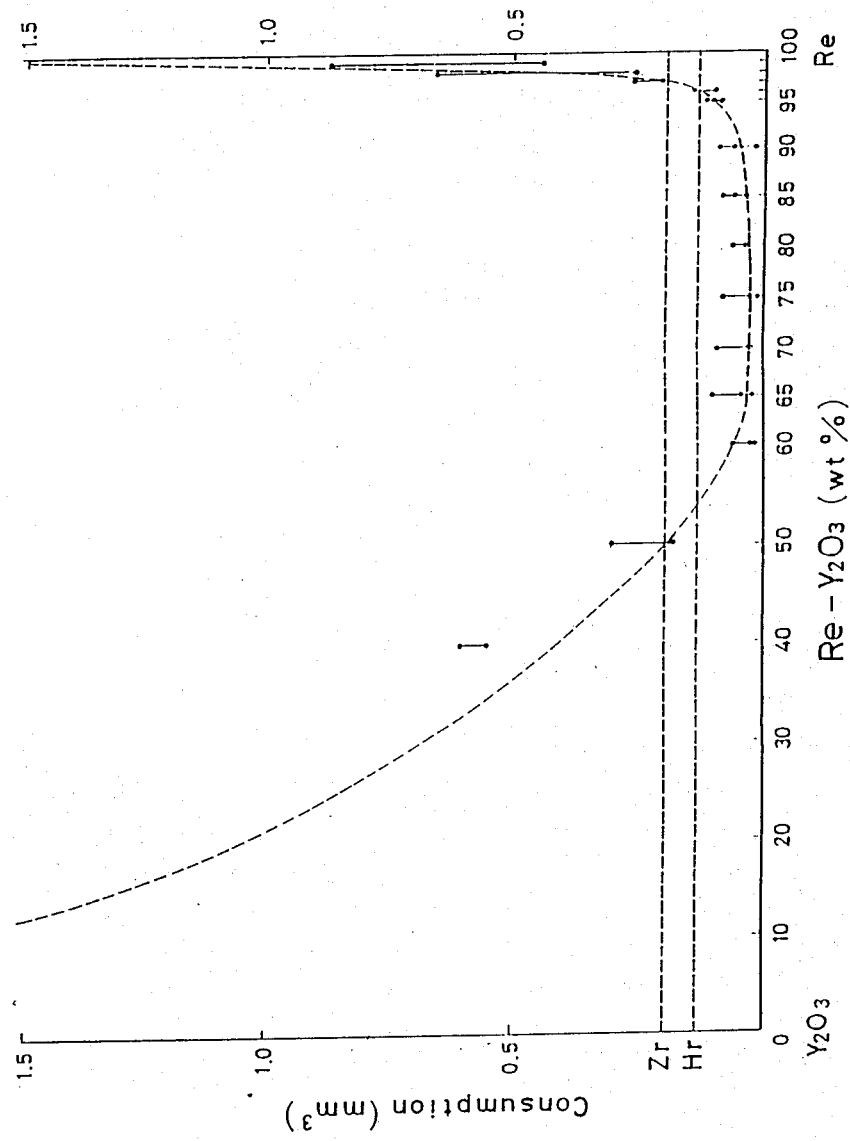

The obtained electrode material was press-fitted into a copper-made chip holder to be used as the cathode, and a water-cooled copper plate was used as the anode, and an arc test was conducted by using the test apparatus shown in FIG. 1 and FIG. 2 to measure the consumption. The results are shown in FIG. 3. In the drawings, numeral 1 is a torch, 2 is an electrode, 2a is an electrode material, 3 is a water-cooled copper plate, 4 is a cutting power source, 5 is an air regulator, 6 is a compressor, 7 is a nozzle, and 8 is a plasma arc.

The test conditions in FIG. 3 were a current of 25 A, a voltage of 95 V, an air pressure of 3.5 kg/cm$^2$, and a duration of 5 minutes. The consumption is expressed in the unit of cubic millimeters (mm$^3$). As understood from FIG. 3, the electrode material of this invention is small in consumption as compared with the conventional electrode materials made from zirconium or hafnium. The preferable range of chemical composition is, as clear from FIG. 3, 50–95 for rhenium, or more preferably, 60–90. Fabrication of this electrode material is relatively easy, and there is no problem in the availability of the materials. In this electrode material, a stable plasma arc was obtained, the consumption was small, and the cut section was straight and smooth when used as a cutting electrode, while the cutting width was small and the cutting speed was fast.

[Embodiment 2]

Ruthenium powder with mean particle size of 15.0 $\mu$m and purity of 99.9%, and yttrium oxide powder with mean particle size of 5.7 $\mu$m and purity of 99.9% were mixed in dry state for 30 minutes by means of a shaker-mixer. A binder was added to this mixture powder to granulate. Obtained grains of mixture powder of ruthenium (Ru) and yttrium oxide ($Y_2O_3$) were pressurized in a mold to become compressed powder of 2 mm in diameter and 4 mm in length (compressed powder density 65 to 75%), and it was presintered in hydrogen steam (500° C.×15 minutes) and sintered (2,100° C.×30 minutes) by conventional method, and an electrode material made of a sinter of 1.8 mm in diameter and 3.5 mm in length was obtained.

The obtained electrode material was press-fitted into a copper-made chip holder to be used as the cathode, and a water-cooled copper plate was used as the anode, and an arc test was conducted by using the test apparatus shown in FIG. 1 and FIG. 2 to measure the consumption. The results are shown in FIG. 4.

The test conditions in FIG. 4 were a current of 25 A, a voltage of 95 V, an air pressure of 3.5 kg/cm$^2$, and a duration of 5 minutes. The consumption is expressed in the unit of cubic millimeters (mm$^3$). As understood from FIG. 4, the electrode material of this invention is small in consumption as compared with the conventional electrode materials made from zirconium or hafnium. The preferable range of chemical composition is, as clear from FIG. 4, 40 to 98% for ruthenium, or more preferably 50 to 96%. Fabrication of this electrode material is relatively easy, and there is no problem in the availability of the materials. In this electrode material, a stable plasma arc was obtained, and the consumption was small, and the cut section was straight and smooth when used as a cutting electrode, while the cutting width was small and the cutting speed was fast.

What is claimed is:

1. A discharge electrode material excellent in heat resistance and oxidation resistance consisting essentially of yttrium oxide, and rhenium or ruthenium.

2. A discharge electrode material as set forth in claim 1, wherein yttrium oxide is present in amounts of 50 to 5% by weight, and rhenium is present in amounts of 50 to 95% by weight.

3. A discharge electrode material as set forth in claim 1, wherein yttrium oxide is present in amounts of 60 to 2% by weight, and ruthenium is present in amounts of 40 to 98% by weight.

* * * * *